US011934341B2

(12) United States Patent
Zhu et al.

(10) Patent No.: US 11,934,341 B2
(45) Date of Patent: *Mar. 19, 2024

(54) VIRTUAL RDMA SWITCHING FOR CONTAINERIZED

(71) Applicant: MICROSOFT TECHNOLOGY LICENSING, LLC, Redmond, WA (US)

(72) Inventors: Yibo Zhu, Kirkland, WA (US); Jitendra D. Padhye, Redmond, WA (US); Hongqiang Liu, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,878

(22) Filed: Jun. 17, 2022

(65) Prior Publication Data
US 2022/0318184 A1    Oct. 6, 2022

Related U.S. Application Data

(60) Continuation of application No. 17/136,874, filed on Dec. 29, 2020, now Pat. No. 11,372,802, which is a
(Continued)

(51) Int. Cl.
*G06F 15/173* (2006.01)
*G06F 9/455* (2018.01)
(Continued)

(52) U.S. Cl.
CPC .... *G06F 15/17331* (2013.01); *G06F 9/45558* (2013.01); *G06F 12/1072* (2013.01);
(Continued)

(58) Field of Classification Search
CPC .......... G06F 15/17331; G06F 9/45558; G06F 12/1072; G06F 13/28; G06F 2009/45583;
(Continued)

(56) References Cited

U.S. PATENT DOCUMENTS 10,303,644 B2 *  5/2019  Franke ............... H04L 67/1097
2006/0101225 A1 *  5/2006  Aloni ................. H04L 12/4633
                                                        711/202

(Continued)

OTHER PUBLICATIONS

"File Descriptor", Retrieved From: https://en.wikipedia.org/w/index.php?title=File_descriptor&oldid=820786199, Jan. 16, 2018, 5 Pages.
(Continued)

*Primary Examiner* — Nicholas R Taylor
*Assistant Examiner* — Tania M Pena-Santana
(74) *Attorney, Agent, or Firm* — Newport IP, LLC; Han K. Gim

(57) ABSTRACT

Distributed computing systems, devices, and associated methods of virtual RDMA switching are disclosed herein. In one embodiment, a method includes intercepting a command from an application in a container to establish an RDMA connection with a remote container on a virtual network. In response to the intercepted command, an RDMA endpoint at a physical NIC of a server is created. The method can also include intercepting another command to pair with a remote RDMA endpoint corresponding to the remote container. The intercepted another command contains data representing a routable network address of the remote RDMA endpoint in the RDMA computer network. Then, the RDMA endpoint created at the physical NIC of the server can be paired with the remote RDMA endpoint using the routable network address of the remote RDMA endpoint.

20 Claims, 14 Drawing Sheets

Related U.S. Application Data division of application No. 15/944,373, filed on Apr. 3, 2018, now Pat. No. 10,909,066.

(51) Int. Cl.

| | |
|---|---|
| *G06F 12/1072* | (2016.01) |
| *G06F 13/28* | (2006.01) |
| *H04L 12/46* | (2006.01) |
| *H04L 49/00* | (2022.01) |
| *H04L 49/15* | (2022.01) |
| *H04L 67/1097* | (2022.01) |
| *H04L 67/141* | (2022.01) |

(52) U.S. Cl.
CPC .......... *G06F 13/28* (2013.01); *H04L 12/4641* (2013.01); *H04L 49/15* (2013.01); *H04L 49/70* (2013.01); *H04L 67/1097* (2013.01); *H04L 67/141* (2013.01); *G06F 2009/45583* (2013.01); *G06F 2009/45595* (2013.01); *G06F 2212/1041* (2013.01); *G06F 2212/152* (2013.01); *G06F 2212/154* (2013.01)

(58) Field of Classification Search
CPC ... G06F 2009/45595; G06F 2212/1041; G06F 2212/152; G06F 2212/154; H04L 12/4641; H04L 49/15; H04L 49/70; H04L 67/1097; H04L 67/141
See application file for complete search history.

(56) References Cited

U.S. PATENT DOCUMENTS

| | | | |
|---|---|---|---|
| 2013/0332767 A1* | 12/2013 | Fox | H04L 67/025 714/4.3 |
| 2015/0317280 A1* | 11/2015 | Magro | G06F 13/4068 710/301 |
| 2016/0188527 A1* | 6/2016 | Cherian | H04L 41/12 709/212 |
| 2018/0157224 A1* | 6/2018 | Carrette | G05B 13/048 |

OTHER PUBLICATIONS

"Summons to attend oral proceedings Issued in European Patent Application No. 19715353.9", dated May 4, 2023, 8 Pages.

* cited by examiner

VIRTUAL RDMA SWITCHING FOR CONTAINERIZED

CROSS-REFERENCE TO RELATED APPLICATION(S)

This application is a continuation application of and claims priority to U.S. patent application Ser. No. 17/136,874, filed on Dec. 29, 2020, which claims priority to U.S. patent application Ser. No. 15/944,373, filed on Apr. 3, 2018, the content of which applications are hereby expressly incorporated herein by reference in their entirety.

BACKGROUND

Datacenters typically include routers, switches, bridges, and other physical network devices that interconnect a large number of servers, network storage devices, and other types of computing devices via wired or wireless network links. The individual servers can host one or more virtual machines, containers, or other types of virtualized components to provide various cloud computing services accessible to cloud computing clients. The virtual machines or containers can exchange messages via virtual networks in accordance with one or more network protocols supported by the physical network devices

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud computing can utilize multiple virtual machines on one or more servers to accommodate computation, communications, or other types of cloud service requests from users. However, virtual machines can incur a significant amount of overhead. For example, each virtual machine needs a corresponding operating system, virtual memory, and applications, all of which can amount to large data sizes. In contrast, containers (e.g., Dockers) are software packages that each contain a piece of software in a complete filesystem with code, runtime, system tools, system libraries, etc. to enable the piece of software to run. Containers running on a single server or virtual machine can all share the same operating system kernel and can make efficient use of physical or virtual memory. As such, cloud applications are increasingly deployed using containerization for high resource efficiencies and lightweight isolation.

Also, many data-intensive applications (e.g., data analytics and deep learning frameworks) are adopting or looking to adopt remote direct memory access (RDMA) for high networking performance. RDMA is a technique that allows a computer, a virtual machine, an application, or an application service to directly access memory locations of a remote computer via a computer network without involving operating system on either endpoints. An RDMA connection can allow ultra-low network latency communications (e.g., less than 25 µs) between computers. RDMA can also have low CPU utilization and high bandwidth on individual connections. RDMA can be implemented in various manners. In one example, RDMA can be implemented using hardware components such as hardware connection adapters ("HCAs") to process RDMA traffic using queue pairs (QPs) and completion queues (CQs). A queue pair can include a write queue and a corresponding read queue. RDMA networking can offer higher throughput, lower latency, and lower CPU utilization than TCP/IP based networking. Thus, many data-intensive applications, e.g., deep learning and data analytics frameworks, are adopting RDMA.

Unfortunately, containerization and RDMA networking can be at odds with each other in cloud computing systems. Containerization is to provide an efficient and flexible management of applications. As such, containers deployed in a cloud computing environment may have certain properties that conflict with RDMA networking. For example, in a cloud computing environment, each container has a distinct network namespace, for example, including a port space, a routing table, and network interfaces, to eliminate conflicts with other containers on a single server. A container can also use virtual networks to communicate with other containers using virtual IP addresses. The virtual IP addresses of containers typically persist regardless which server the containers are hosted on or migrated to. In addition, certain control plane policies (e.g., admission control, routing, etc.) and data plane policies (e.g., QoS, metering, etc.) may need to be enforced particularly for multi-tenant cloud computing environments.

The foregoing properties can allow a cloud computing environment to freely place and migrate containers and control resources each container can use. To this end, in TCP/IP-based operations, networking is fully virtualized via a software switch commonly referred to as a virtual switch. However, to fully virtualize RDMA-based networking may be difficult. In particular, RDMA offloads network processing to RDMA enabled physical network interface cards or RNICs (e.g., HCAs) and bypasses a corresponding operating system to achieve high networking performance. Thus, modifying control plane properties (e.g., network routes) in hardware in a shared cloud computing environment may be difficult because RDMA network traffic is directly carried between system memory (e.g., RAM) and a physical NIC via, for instance, a Peripheral Component Interconnect Express (PCIe) bus. As a result, certain data-intensive applications that have adopted both containerization and RDMA use RDMA only when running in dedicated bare-metal computing clusters. However, using dedicated computing clusters is not cost efficient both for cloud service providers or users.

Several embodiments of the disclosed technology are directed to a software-based RDMA virtualization framework (referred to herein as RDMA virtual switching or RvS) designed for containerized cloud computing systems. Embodiments of the RDMA virtualization framework can provide isolation for multi-tenancy, portability for container migrations, and controllability of control and data plane policies for containers. The disclosed RDMA virtualization framework is also transparent to applications executing in containers and can provide networking performance close to bare-metal RDMA.

In certain implementations, the RDMA virtualization framework can have full access to both control path (e.g., address, routing, etc.) and data path (e.g., data traffic) of network communications among containers while being transparent to the application. Such transparency may be a challenge because RDMA networking uses RNIC hardware to manipulate memory buffers and file descriptors, while applications inside containers do not directly interact with RNIC hardware due to network virtualization. However, containers are essentially processes and can share resources like memory and file descriptors with the RDMA virtualization framework. Thus, when an RDMA virtualization framework and a container share a single memory location and file descriptor, any operations of the underlying physical RNIC would automatically take effect in the container.

In certain embodiments, the disclosed RDMA virtualization framework can include several software components running on each server to cooperatively virtualize RDMA networking operations of physical RNICs. In one implementation, the software components can include an RvS driver corresponding to a container and operatively coupled to an RvS router. The RvS driver and the RvS router can be configured to intercept certain RDMA calls (e.g., via an application programming interface or API) for certain operations from an application executing in the container to a virtual NIC and translate the intercepted calls into operations of a physical RNIC. For example, when establishing an RDMA connection, the application can query a hosting server for a list of NICs that support RDMA. The RvS driver can intercept this call and in response, provide to the application metadata of the virtual NIC. The metadata can include data representing a behavioral description of the virtual NIC including, for instance, semantics of virtual NIC services the virtual NIC can perform.

Based on the received metadata of the virtual NIC, the application can then issue a command to create a QP (referred to herein as virtual QP) on the virtual NIC. The RvS router can receive the command and in response create a corresponding QP' on the physical RNIC, and the RvS driver can return to the application a QP-ID of the created QP' and other metadata upon completion of creating the QP'. The application can then issue another command to register a block of memory ("mem") to the created QP indicating that data contained in mem is to be transmitted via the created QP. In response, the RvS router allocates a corresponding block of memory ("s-mem") of the same size of mem and register s-mem to the created QP'.

The application can then query for an address (sometimes referred to as GID in RDMA) and other suitable information (e.g., encryption keys) of the created QP for pairing with a remote QP. In response, the RvS router returns to the application the actual GID of the created QP' on the physical RNIC. The application can then exchange the GID and the QP-ID of the created QP' on the physical RNIC with a remote endpoint (e.g., a remote container) for pairing. The remote endpoint can be identified by a virtual network address of a virtual network to which the container is member. Such exchanges can be via a TCP/IP, RDMA-CM, or other suitable types of channels. Upon successful completion, the application can then pair the virtual QP with another QP of the remote endpoint having a corresponding GID' identifying the another QP on another physical RNIC at the remote endpoint. The RvS driver can then forward the GID' of the remote endpoint to the RvS router, which in turn pairs the created QP' on the physical RNIC with the QP of the remote endpoint. As such, even though the remote endpoint may be identified by a virtual network address, the created QP' on the physical RNIC is paired with the another QP on another physical RNIC, thereby achieving network name translation. The application can then instruct the created QP to be ready for use. In response, the RvS router instructs the created QP' on the physical RNIC to be ready for use.

During data transmission, for example, a send operation, the application can instruct the virtual QP to send a block of data (e.g., by invoking a SEND command) from mem to the remote endpoint identified by the virtual network address. In response, the RvS driver can copy the block of data from mem to s-mem, and the RvS router can instruct the physical RNIC to send (e.g., by invoking another SEND command) the copied data from s-mem to the QP on the another physical RNIC at the remote endpoint. Thus, virtualization of RDMA networking can be achieved on the server for individual containers because the RvS driver and RvS router can cooperate to convert any RDMA operations by the application on the virtual NIC to those on the physical RNIC without having the application to directly interact with the physical RNIC.

Several embodiments of the RDMA virtualization framework disclosed herein can offer throughput and latency that is comparable to bare-metal RDMA. The performance of an example RDMA virtualization framework generally similar to that described above was evaluated. The example RDMA virtualization framework achieved performance levels comparable to bare-metal RDMA networking with little processor overhead. The example RDMA virtualization framework also significantly boosted performance of tested applications by up to 14.6 times more in throughput and about 98% lower in latency over using conventional TCP/IP virtual networking.

DETAILED DESCRIPTION

Figure 1:
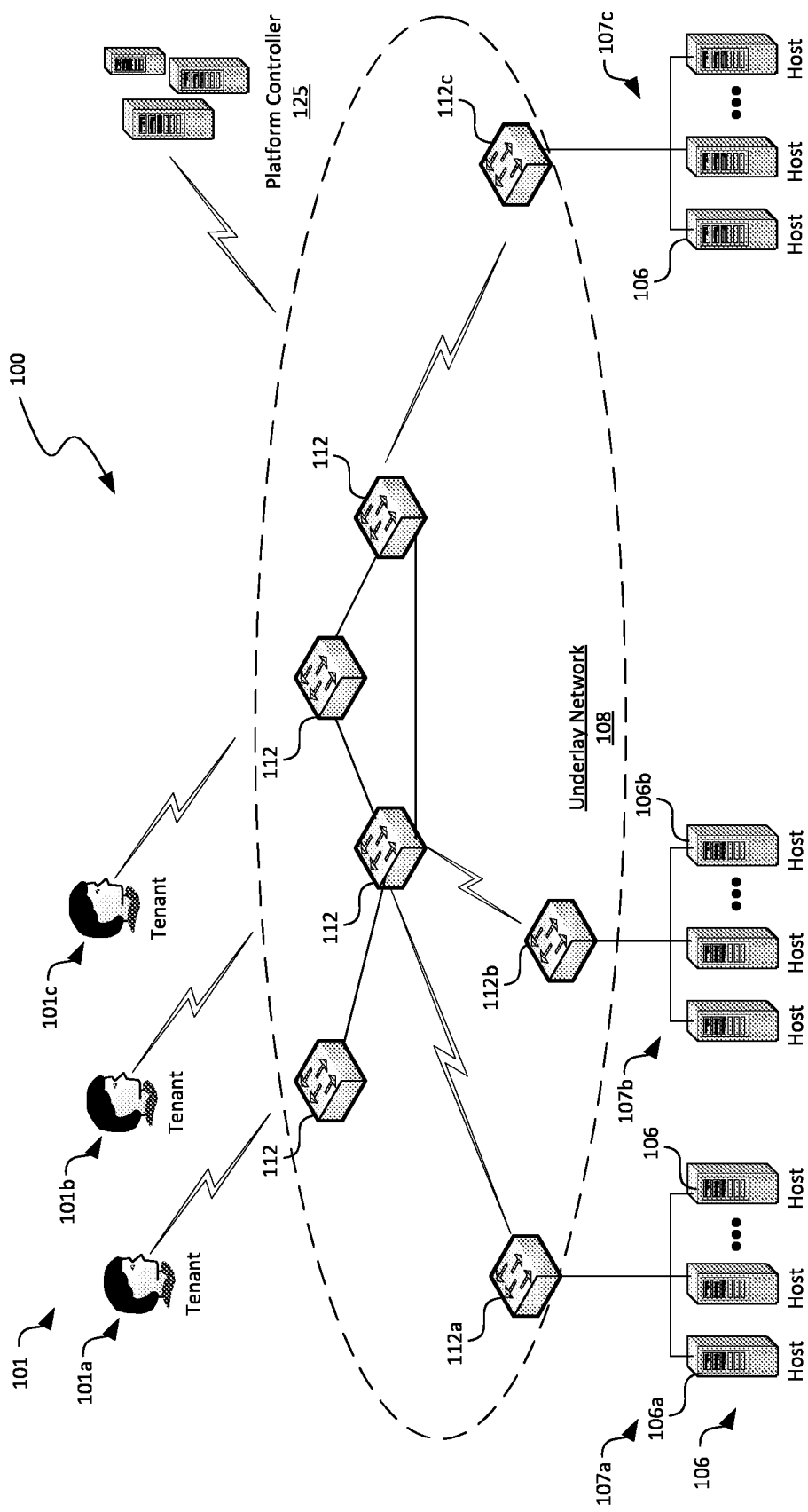
FIG. 1 is a schematic diagram illustrating a distributed computing system implementing virtual RDMA switching in accordance with embodiments of the disclosed technology.

Certain embodiments of systems, devices, components, modules, routines, data structures, and processes for virtual RDMA switching for containerized applications in datacenters or other suitable distributed computing systems are described below. In the following description, specific details of components are included to provide a thorough understanding of certain embodiments of the disclosed technology. A person skilled in the relevant art will also understand that the technology can have additional embodiments.

The technology can also be practiced without several of the details of the embodiments described below with reference to FIGS. 1-8.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, the term "container" generally refers to a software package that contains a piece of software (e.g., an application) in a complete filesystem having codes (e.g., executable instructions), a runtime environment, system tools, system libraries, or other suitable components sufficient to execute the piece of software. Containers running on a single server or virtual machine can all share the same operating system kernel and can make efficient use of system or virtual memory. A container can have similar resource isolation and allocation benefits as virtual machines. However, a different architectural approach allows a container to be much more portable and efficient than a virtual machine. For example, a virtual machine typically includes one or more applications, necessary binaries and libraries of the applications, and an entire operating system. In contrast, a container can include an application and all of its dependencies, but shares an operating system kernel with other containers on the same host. As such, containers can be more resource efficient and flexible than virtual machines. One example container is a Docker provided by Docker, Inc. of San Francisco, California.

Containers are a good choice to package and deploy datacenter applications. A container bundles executables and dependencies of an application in an independent namespace using mechanisms such as chroot to offering a lightweight isolation and portability solution. Certain applications can be configured to use a microservice architecture composed of multiple containers. During operation, the containers can exchange data via a networking solution. The design of the networking solution can affect a degree of isolation and portability of containers. For instance, in one mode, containers can directly use an IP and port space of a server or host, and communicate like an ordinary process in an operating system of the host. This mode, however, has poor isolation and poor portability.

Thus, many applications use a virtual networking mode for communication. In virtual networking, network namespaces of containers are fully isolated. Containers communicate via a virtual (i.e., overlay) network composed of software virtual switches on a host. The virtual IP addresses of the containers are highly portable because routes to the virtual IP addresses can be controlled in software virtual switches. Such isolation and portability can provide flexibility in container placement and migration. This mode also allow controllability for cloud providers to enforce policies on both control and data planes. Thus, container orchestrators like Kubernetes mandate the use of virtual networking mode.

The use of virtual networking mode may conflict with implementing RDMA networking for containers. Many modern applications (e.g., deep learning and data analytics frameworks) have adopted RDMA networking to achieve higher throughput and lower latency than the traditional TCP/IP stack. RDMA provides such performance by offloading a large amount of networking functionality to a physical RDMA enabled NIC (RNIC), effectively bypassing operating system kernel. Thus, modifying control plane states (e.g., routes) in hardware in shared cloud computing environments may be difficult because network traffic is directly carried between memory (e.g., RAM) and the RNIC. As a result, data-intensive applications that have adopted both technologies use RDMA only when running in dedicated bare-metal clusters. However, using dedicated clusters to run an application is not cost efficient both for cloud service providers or users.

Several embodiments of the disclosed technology can address at least certain aspects of the foregoing difficulties by implementing a software-based RDMA framework configured for RDMA virtual switching (RvS). The software-based RDMA framework can be configured to directly access a physical RNIC and serves as an RDMA relay for containers, thereby providing good isolation and portability on the control plane. RvS can also be used to implement network functions on a data plane such as quality of service (QoS) and traffic metering. In certain implementations, RvS can provide a virtual interface (referred to later as a "RvS driver") inside each container to allow applications to use RDMA networking via a virtual network. In certain experiments conducted based on embodiments of the RvS, RDMA performance was observed to be close to bare-metal RDMA, as described in more detail below with reference to FIGS. 1-8.

FIG. 1 is a schematic diagram illustrating a distributed computing system 100 implementing RvS for containerized applications in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated example, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, start, or other suitable types of topology. The underlay network 108 can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the provided virtual machines 144 to perform computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access cloud services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

The platform controller 125 can be configured to manage operations of various components of the distributed computing system 100. For example, the platform controller 125 can be configured to allocate, instantiate, monitor, terminate, or otherwise manage virtual machines 144 (shown in FIG. 2), containers 145 (shown in FIG. 2), applications 147 (shown in FIG. 2), or other suitable resources in the distributed computing system 100, monitor operations of the allocated virtual machines 144, or terminate any allocated virtual machines 144 once operations are complete. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

Figure 2:
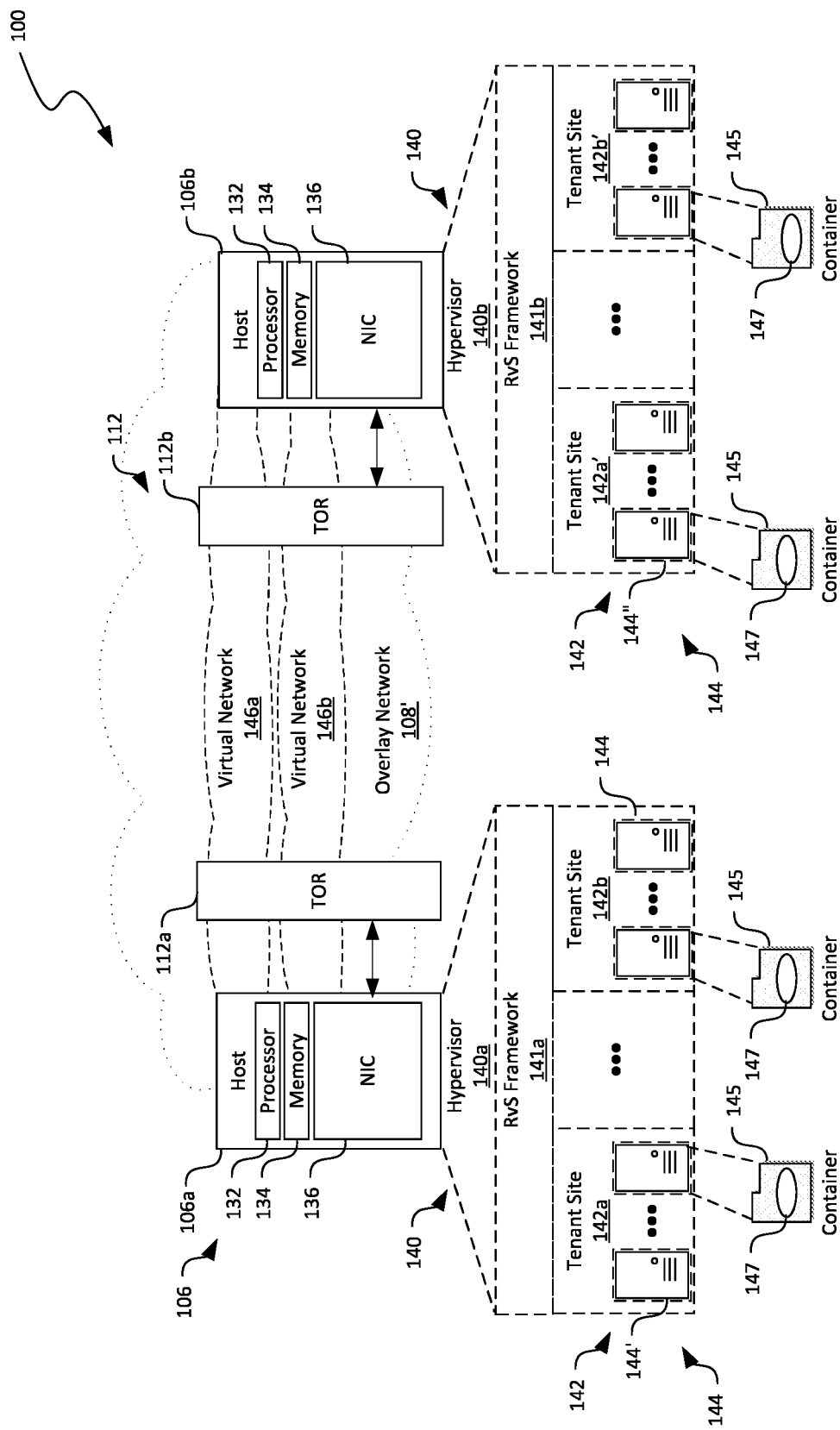
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and a network interface card 136 (shown as NIC 136) operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7A-7C). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The first and second hosts 106a and 106b can individually contain instructions in the memory 134 executable by the processors 132 to cause the individual hosts 106 to provide a hypervisor 140 (identified individually as first and second hypervisors 140a and 140b) and a RvS framework 141 (identified individually as first and second RDMA framework 141a and 141b). As described in more detail below with reference to FIGS. 3A-3E, the RvS framework 141 can include multiple software components such as a RvS driver and RvS router configured to cooperatively achieve RDMA virtual switching. Even though the hypervisor 140 and the RvS framework 141 are shown as separate components, in other embodiments, the RvS framework 141 can be another container, a part of the hypervisor 140 (e.g., operating on top of an extensible switch of the hypervisors 140), an operating system (not shown) executing on the hosts 106, a firmware component of the hosts 106, or in other suitable configurations.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). As shown in FIG. 2, in the illustrated example, the individual virtual machines 144 can host one or more containers 145. The individual containers 145 can be configured to execute suitable instructions of at least a part of an application 147. For example, in certain implementations, a container 145 can be configured to execute suitable instructions to provide one computing service for an application 147 while another container 145 can be configured to provide another computing service for the same application 147. In further embodiments, a single container 145 can be configured to execute suitable instructions for a complete application 147.

As shown in FIG. 2, to facilitate communications with one another or with external devices, the individual hosts 106 can also include a network interface card ("NIC") 136 for interfacing with a computer network (e.g., the underlay network 108 of FIG. 1 or the RDMA network 138 in FIGS. 3A-3E). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, in certain implementations, the NIC 136 can include one or more RDMA enabled NICs configured to facilitate RDMA communications to/from the containers 145, the virtual machines 144, and/or other suitable software components executing on the hosts 106.

The virtual machines 144 and the containers 145 on the virtual networks 146 can communicate with one another via RDMA networking even though the virtual machines 144 and the containers 145 may be located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 or container 145 in a particular virtual network 146. Thus, different virtual networks 146 can use one or more virtual network addresses that are the same. Example virtual network addresses can include IP addresses, MAC addresses, and/or other suitable addresses. To facilitate communications among the containers 145, the RvS framework 141 can be configured to intercept and translate RDMA calls for operations from the applications 147 to calls for corresponding operations to the NICs 136, as described in more detail below with reference to FIGS. 3A-3E.

FIGS. 3A-3E are schematic diagrams illustrating certain hardware/software components of the distributed computing system 100 during RDMA connection establishment in accordance with embodiments of the disclosed technology. In the example illustrated in FIGS. 3A-3E, two hosts 106 (identified individually as a first host 106a shown as "Host1" and second host 106b shown as "Host2") are used to illustrate aspects of the disclosed technology. The first host 106a is hosting first and second containers 145a and 145b while the second host 106b is hosting a third container 145c. The hosts 106 can be communicatively coupled to each other by a RDMA network 138 via corresponding physical NICs 136 (identified as first and second physical NICs 136a and 136b). The physical NICs 136 can include any suitable RDMA enabled NICs. One example RDMA enabled NIC is a ConnectX®-4 Lx EN Ethernet adapter provided by Mellanox Technologies, Inc. of Sunnyvale, California.

Figure 3A:
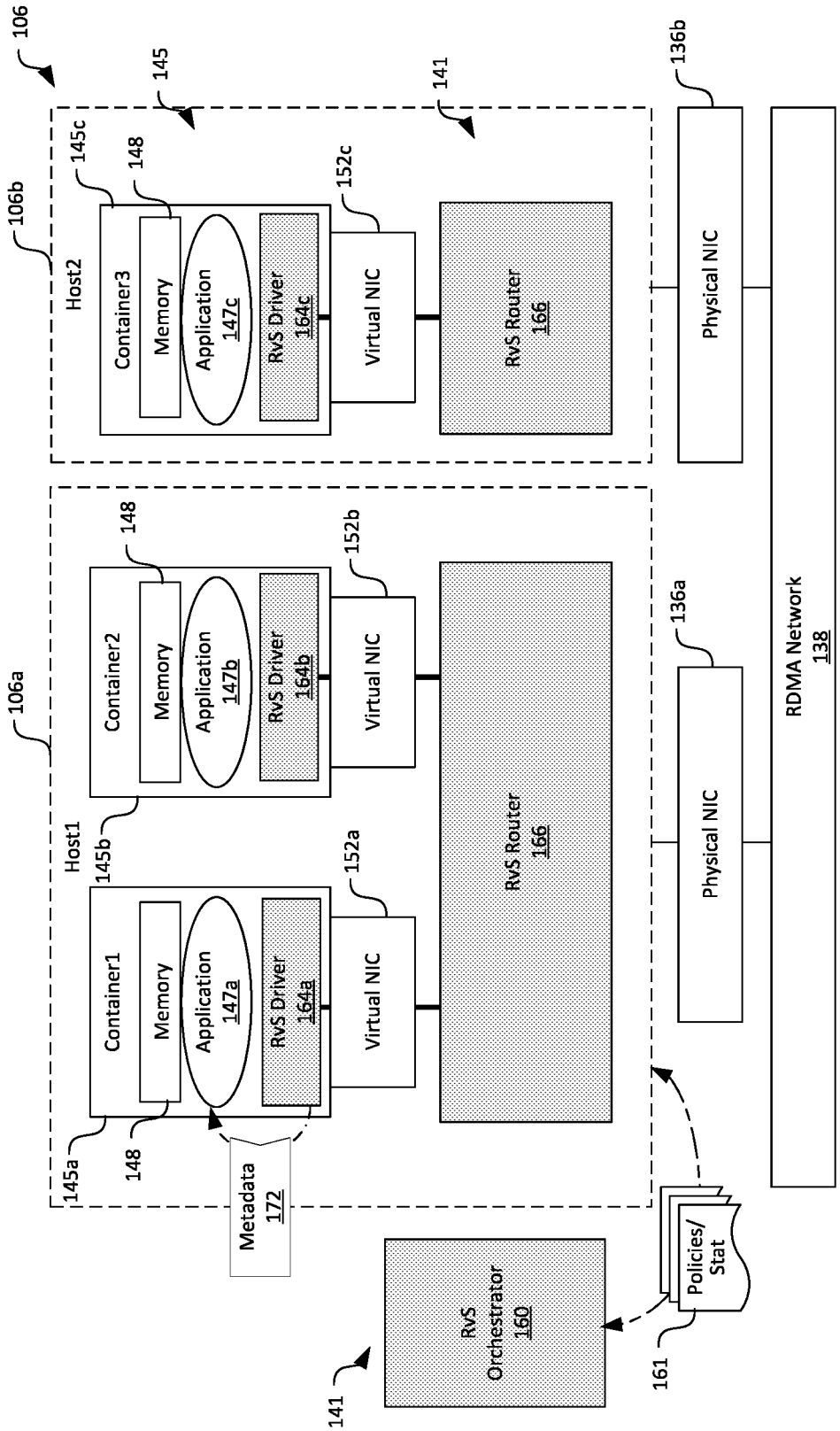
FIGS. 3A-3E are schematic diagrams illustrating a software-based RDMA virtualization framework implemented in a distributed computing system during connection establishment in accordance with embodiments of the disclosed technology.

As shown in FIG. 3A, the individual hosts 106 can execute suitable instructions to provide one or more containers 145, virtual NICs 152 corresponding to each container 145, and one or more components of the RvS framework 141. The containers 145 can individually contain and execute one or more applications 147 (identified as first, second, and third applications 147a-147c, respectively). In the illustrated example, the first host 106a is hosting the first and second containers 145a and 145b that respectively containing the first and second applications 147a and 147b.

The second host 106b is shown as hosting a third container 145c that contains a third application 147c. Each of the applications 147 can have a corresponding allocated memory 148, for instance, as a portion of the memory 134 in FIG. 2 allocated to the applications 147. During operation, the applications 147 may communicate with one another via RDMA networking as facilitated by the RvS framework 141, as described in more detail below.

The virtual NICs 152 (identified individually a first, second, and third virtual NICs 152a-152c, respectively) are configured as a bridge between the containers 145 and the physical NICs 136. The virtual NICs 152 can be implemented via a combination of code in the hypervisor 140 of FIG. 2 and/or the applications 147. For example, the hypervisor 140 can export a number of virtual I/O ports and a virtual IRQ that represent a virtual NIC 152 on a host 106. As described in more detail below, the RvS framework 141 can be configured to allow transparent RDMA operations in the physical NICs 136 as virtual RDMA operations in the virtual NICs 152 by the applications 147.

As shown in FIG. 3A, for each container 145, the RvS framework 141 can include (i) an RvS driver 164 (RvS-L), (ii) a RvS router 166 (RvS-R), and (iii) a RvS network orchestrator 160 (RvS-O) operatively coupled to one another. The foregoing components of the RvS framework 141 are shown in FIG. 3A as shaded components. In certain embodiments, the RvS-O can be configured to make control-plane decisions for all containers 145 in a computing cluster based on user-defined configurations. The RvS-O can also be configured to monitor operations of the containers 145 and collect operating data in real time or in other suitable manners. For example, as shown in FIG. 3A, the RvS-O can be configured to enforce policies as well as collecting statistics 161 of RDMA operations of the containers 145. In one implementation, the RvS-O can be implemented as a cloud computing service provided by one of the hosts 106 in FIG. 1. In other implementations, the RvS-O can also be implemented as a stand-alone server or in other suitable configurations.

RvS-L can be configured to coordinate with RvS-R to provide virtual RDMA networking. For example, in certain implementations, during connection establishment, the RvS-L can be configured to intercept RDMA calls (e.g., API calls) for operations on the virtual NIC 152 and cooperate with the RvS-R to translate the calls to those for operations on the physical NIC 136, as described in more detail below with reference to FIGS. 3B-3F. During data transmission, the RvS-L can also be configured to perform data copying, completion polling, or other suitable operations. In certain embodiments, the RvS-L can be implemented as a software library. In other embodiments, the RvS-L can also be implemented as other suitable software modules, packages, or components.

As shown in FIG. 3A, each host 106 can run a single instance of the RvS-R that works with all containers 145 on the same host 106. In a data plane, the RvS-R can share a shadow memory 154 (shown in FIG. 3B) or other suitable memory buffers with containers 145 on the same host 106 and isolates the shared shadow memory 154 for different containers 145. RvS-R sends and receives data in the shared shadow memory 154 through the virtual NIC 152 while relying on the RvS-L to synchronize data between private data buffers (e.g., the memory 148) and the shared shadow memory 154. The RvS-R implements the data-plane resource policies, e.g., quality of service (QoS), by controlling a communication channel between containers 145 and the RvS-R. The RvS-R can also be configured to cooperate with the RvS-O to handle bookkeeping tasks such as IP address assignments.

Several embodiments of RDMA virtual switching disclosed herein can transparently supports all types of RDMA operations. There are various types of RDMA operations including one-sided and two-sided operations for data transfer, poll and event-based mechanisms for completion notification, and TCP/IP and RDMA-CM for connection establishment. With one-sided operations such as WRITE and READ, a writer (reader) can write (read) data to (from) a specific memory address in a remote endpoint, without the remote endpoint being aware of this operation. With two-sided operations such as SEND and RECV, the receiver first gets ready to receive before a sender sends out data. Also, applications 147 can use either poll-based or event-based mechanisms to receive work completion notifications. Several embodiments of RDMA virtual switching disclosed herein can also provide near bare-metal RDMA performance with little or no CPU and memory overhead, as described in more detail below.

FIG. 3A illustrate an initial operation during communication establishment process between containers 145. In the illustrated example, the first application 147a in the first container 145a on the first node 106a initiates a connection process to establish RDMA communication with the third application 147c in the third container 145c on the second node 106b. In other examples, similar operations may be performed to establish RDMA communication between containers 145 on the same or different hosts 106. Both the first and third applications 147a and 147c and/or first and third containers 145a and 145c can be identified using virtual network addresses of a virtual network 146 (FIG. 2) to which both endpoints belong.

As shown in FIG. 3A, the first application 147a first queries for a list of network devices on the first host 106a that support RDMA communication. In response to the query, the RvS-L intercepts the call and responds with a set of metadata 172 representing a behavioral description of the virtual NIC 152 including, for instance, semantics of virtual NIC services and a list of operations or Verbs the virtual NIC 152 can perform.

Figure 3B:
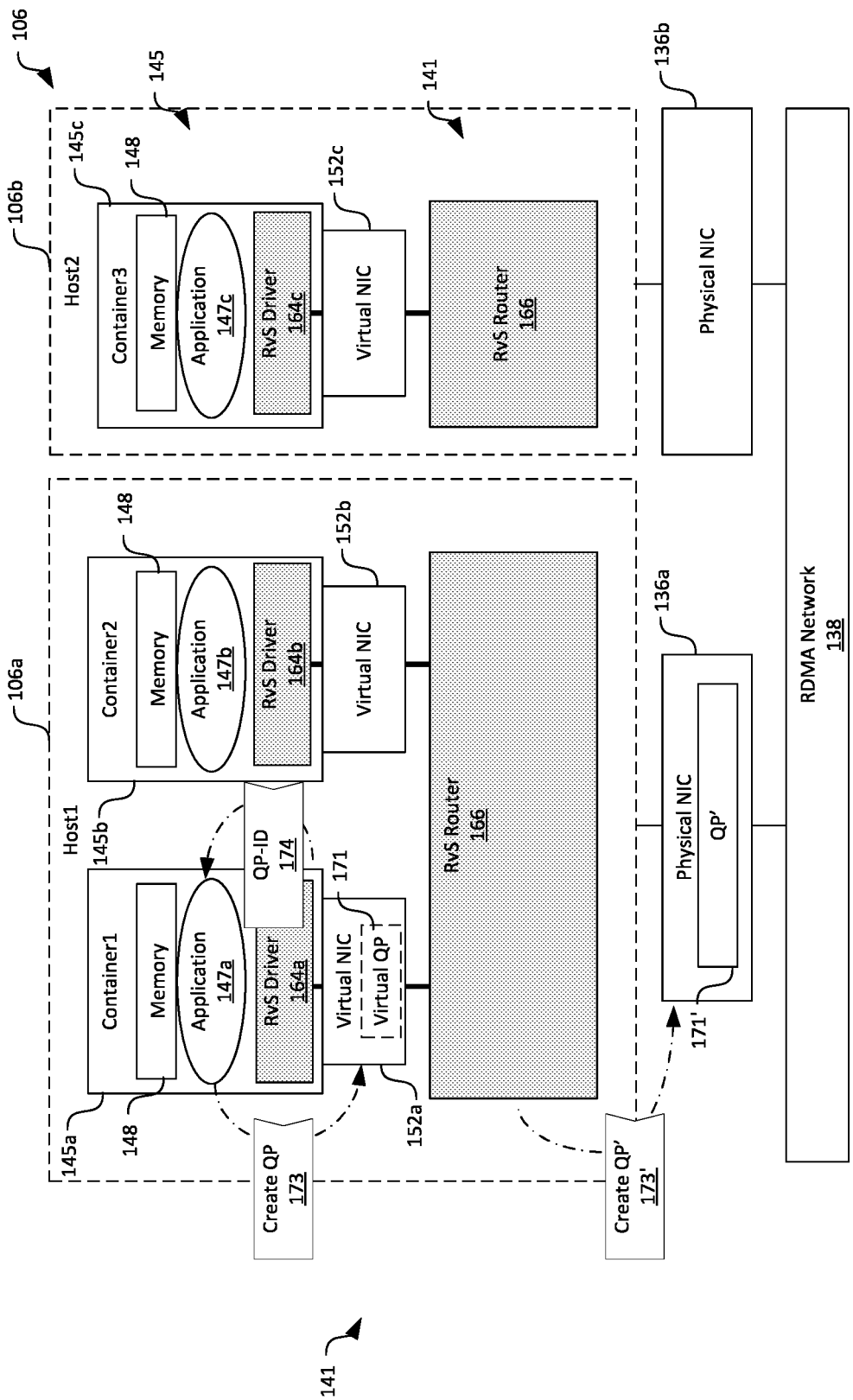

As shown in FIG. 3B, based on the received metadata 172 of the virtual NIC 152, the first application 147a can then issue a command 173 to create a QP 171 (and CQ, not shown in FIGS. 3A-3E) on the virtual NIC 152 for establishing RDMA communication with the third application 147c. Upon intercepting the command 173, the RvS-R creates a corresponding QP' 171' (and CQ', not shown) on the first physical NIC 136a. The created QP' 171' can have an identification (QP-ID) and associated metadata describing behavior profile of the QP' 171'. Upon completion of creating the QP' 171', the RvS-L can return to the first application 147a the QP-ID of the created QP' 171' and other metadata.

Figure 3C:
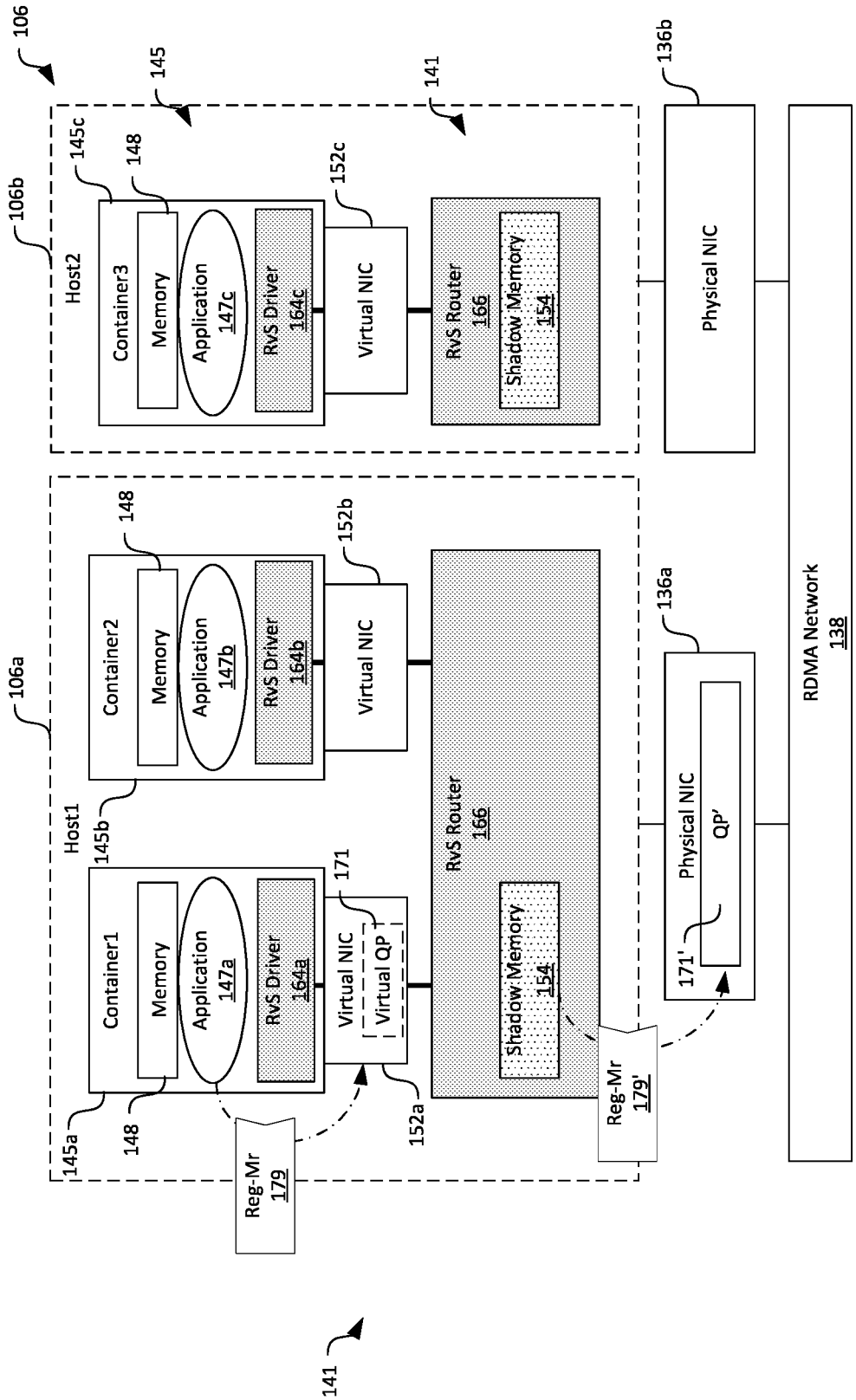

As shown in FIG. 3C, the first application 147a can then issue another command 179 (shown in FIG. 3C as "Reg-Mr") to register a block of memory ("mem") from, for example, the memory 148 to the created QP 171 indicating that data contained in mem is to be transmitted via the created QP 171. In response to the command 179, the RvS-R allocates a corresponding block of memory, shown as in FIG. 3C as shadow memory 154 ("s-mem") of the same size as mem and register s-mem to the created QP' 171'. The shadow memory 154 can be configured to contain the same data as the block of memory registered by the first application 147a. In certain implementations, the mem and s-mem can each include different memory locations in the physical memory 134 (FIG. 2). In other implementations, the mem and s-mem can both include virtual memory blocks that point to the same memory location in the physical memory 134, as described in more detail later with reference to FIG. 4. In the illustrated example, only one shadow memory 154 is shown in FIG. 3C, as corresponding to the first container 145a. In other examples, the RvS-R can also allocate additional shadow memories 154 for other containers 145 hosted on the same host 106, as described in more detail below with reference to FIG. 5.

Figure 3D:
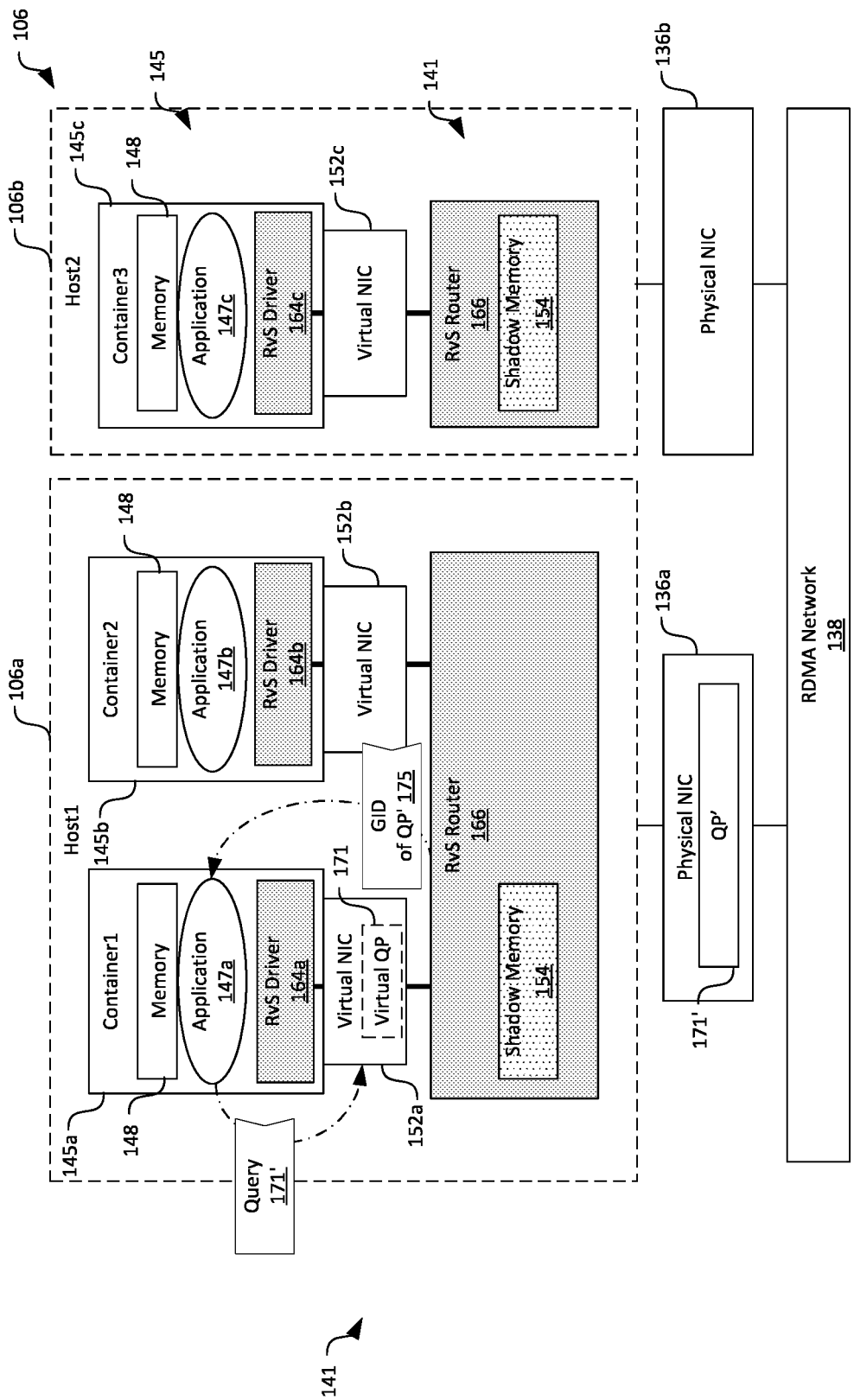
Figure 3E:
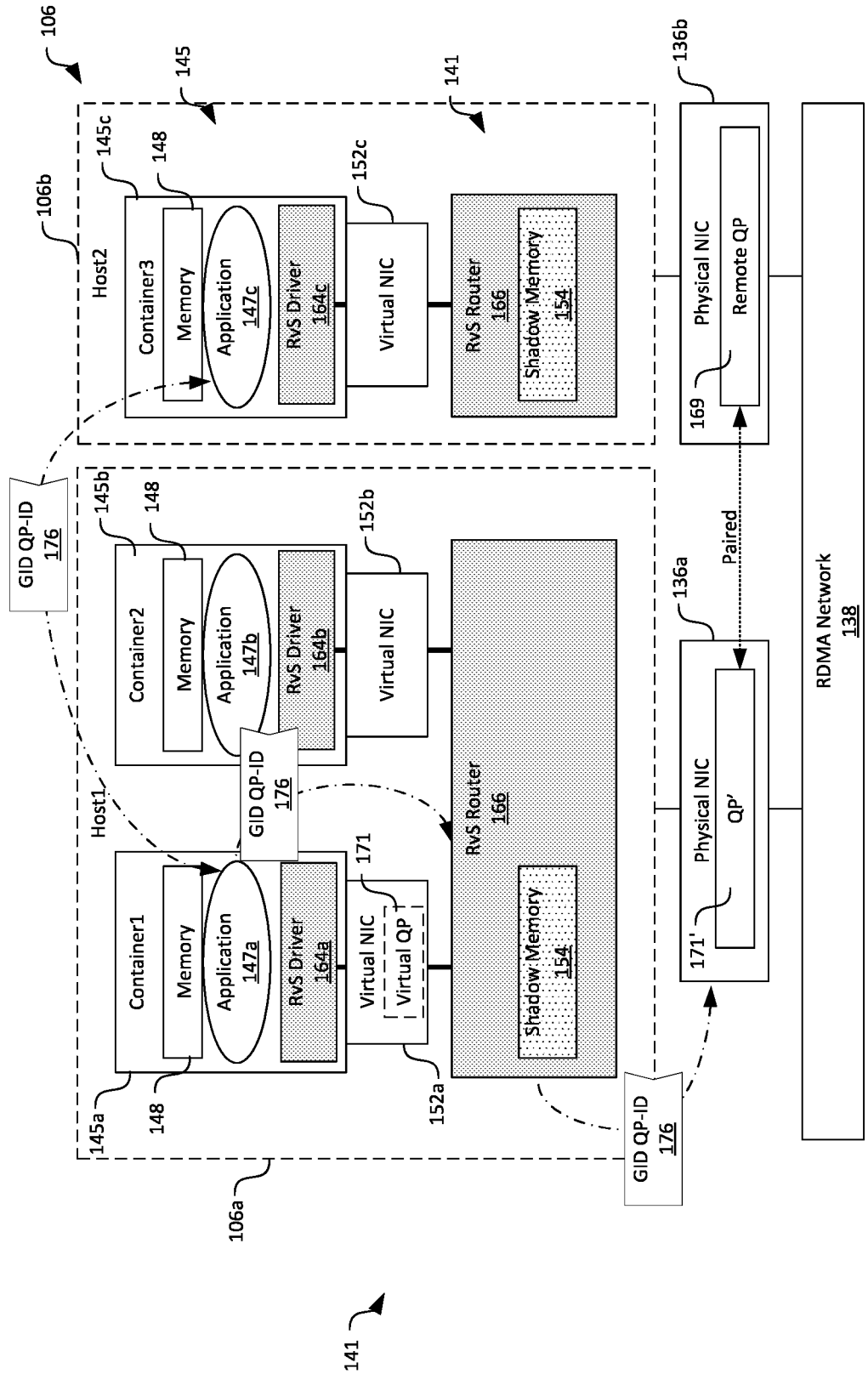

As shown in FIG. 3D, the first application 147a can then query for an address (referred to as GID in RDMA) of the created QP 171 and other suitable information (e.g., encryption keys) for pairing with the third container 145c. In response, the RvS-R returns to the first application 147a the GID 175 of the created QP' 171' on the first physical NIC 136a instead of the GID of the virtual QP 171. As shown in FIG. 3E, the first application 147a can then exchange the GID, the QP-ID, and other suitable information 176 of the created QP' 171' on the first physical NIC 136a with a remote endpoint (e.g., the third container 145c) for pairing. Such exchanges can be via a TCP/IP, RDMA-CM, or other suitable types of channels.

In response to receiving a request to establish an RDMA connection from the first application 147a, the third application 147b and/or the third container 145c can perform operations generally similar to those described above with reference to FIGS. 3A-3D to create a remote QP 169 in the second physical NIC 136b and register another shadow memory 154 allocated to the memory 148 to the created remote QP 169. The third application 147c can then transmit a corresponding GID' identifying the remote QP 169 and other suitable related information to the first application 147a for pairing.

Upon receiving the GID' of the remote QP 169 from the third application 147c, the first application 147a can then pair with the remote QP 169 of the third container 145c at the remote endpoint. The RvS-L can forward the GID' of the remote QP 169 to the RvS-R, which in turn pairs the created QP' 171' on the first physical NIC 171' with the remote QP 169. As such, even though the applications 147 and the containers 145 may be identified by virtual network addresses, the created QP' 171' on the first physical NIC 136a is paired with the remote QP 169 on the second physical NIC 136b. Thus, when the first application 147a initiates a data transfer to the third application 147c identified by a virtual network address, the data transfer is actually carried out via the connection between the QP' 171' and the remote QP 169, thereby achieving network name translation. The first application 147a can then instruct the created QP 171 to be ready for data transfer. In response, the RvS-R instructs the created QP' on the first physical NIC 136a to be ready for data transfer. Upon completion of the foregoing operations, the RDMA connection between the first and third applications 147a and 147c is established.

Figure 4:
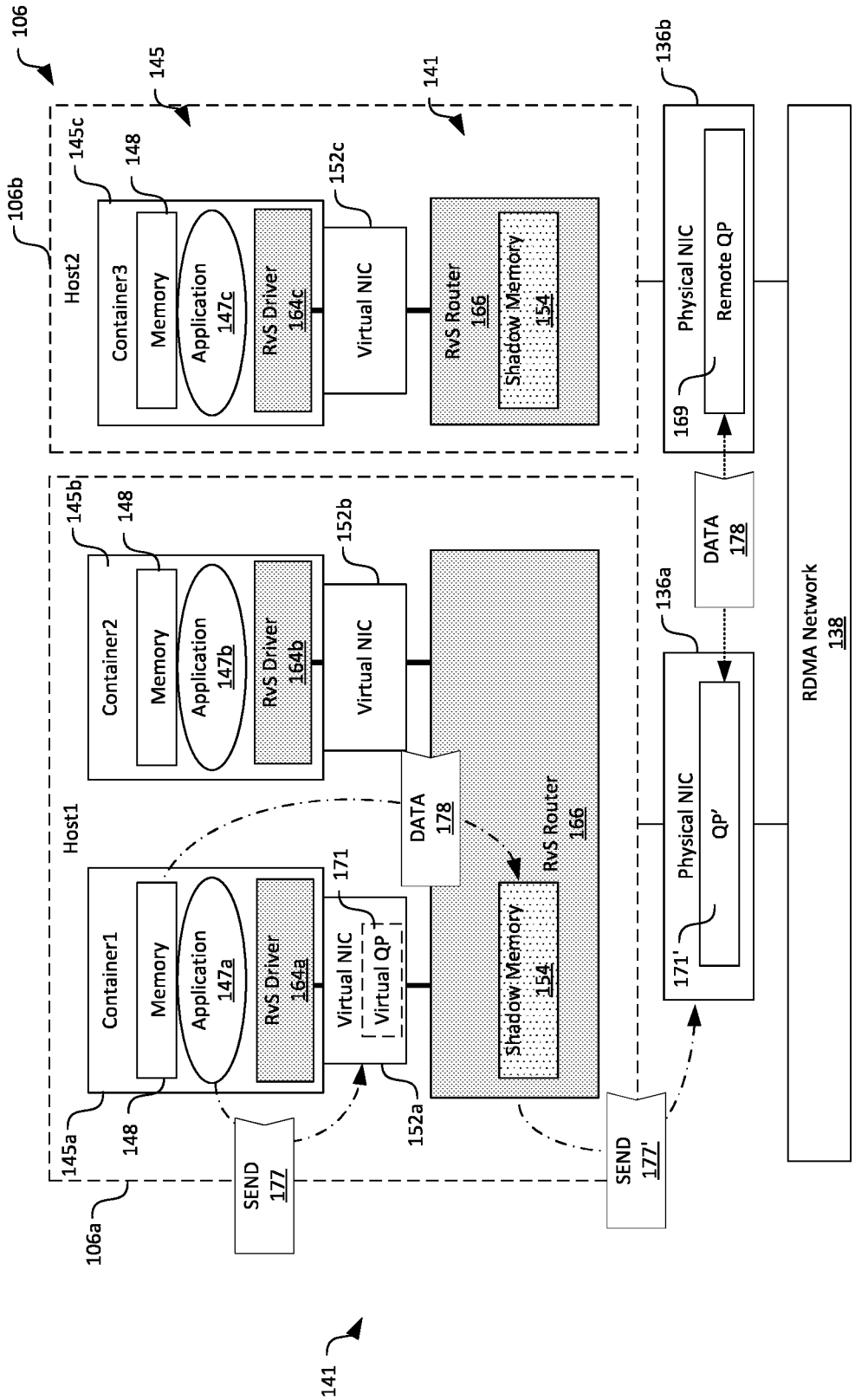
FIG. 4 is a schematic diagram illustrating another software-based RDMA virtualization framework during data transmission in accordance with embodiments of the disclosed technology.

FIG. 4 is a schematic diagram illustrating certain hardware/software components of the distributed computing system 100 during RDMA data transfer in accordance with embodiments of the disclosed technology. For two-sided operations, each sender (e.g., the first application 147a) or receiver (e.g., the third application 147c) may go through two operations to perform a data transfer. The first operation is to use the created QP' 171' and remote QP 169 to start sending or receiving data. The second operation is to use a CQ to get completion notifications. For example, as shown in FIG. 4, the first application 147a can invoke a SEND call 177, and supply a memory pointer to mem indicating a location of data 178 to be sent.

In response to the SEND call 177, in certain embodiments, the RvS-L first copies the data 178 from mem to s-mem in accordance with the received memory pointer. The RvS-R then invokes its own SEND call 177' to send data 178 from s-mem to the remote RvS-R (e.g., the RvS router 166 on the second host 106b). In other embodiments, mem and s-mem can both include a virtual memory block that points to the same memory block in the physical memory 134 (FIG. 2). In such embodiments, the RvS-L can intercepts the SEND call 177 and forward the intercepted call to the RvS-R. The RvS-R in turn can perform a translation of virtual memory address from the pointer to mem (e.g., 10,000) to another pointer to s-mem (e.g., 20,000). The RvS-R can then invoke its own SEND call 177' with the translated virtual memory address to send data 178 from s-mem to the remote RvS-R.

The first application 147a can then either poll CQ or waits for a notification that indicates completion of the send operation. In response to the poll from the first application, the RvS-R can also poll/wait-on CQ' (not shown) associated with the QP' 171' and forwards any notification to the RvS-L, which in turn can forward any notifications to the first application 147a. As such, the presence of the RvS-L and RvS-R is completely transparent to the first application 147a. To the first application 147a, normal RDMA operations are performed on the first virtual NIC 152a even though actual data transfer occurs via the connection between the QP' 171' at the first physical NIC 136a and the remote QP 169 at the second physical NIC 136b.

Copying the data 178 from the memory 148 to the shadow memory 154 may be suitable for two-sided operations. However, such copying may present difficulties for one-sided operations. In one-sided operations, a receiver (e.g., the third application 147c) needs not only the GID of a source (e.g., the first application 147a), but also an address of a remote memory of the source (e.g., memory 148) and a security key for accessing the remote memory. First, a target memory address mem is in the memory 148 of the remote container (e.g., the third container 145c). However, the RvS-R at the first node 106a does not know the corresponding memory 148 on the second node 106b, but only the shadow memory 154. To solve this issue, a central key-value store may be implemented in the RvS-O (FIG. 3A) for all RvS routers 166 to learn the mapping between mem's pointer in application's memory 148 and the corresponding s-mem's pointer in RvS-R's virtual memory space. Updating this table can add latency during connection establishment. Even if the memory mapping is known on the remote endpoint, WRITE and READ can remotely modify or copy data without notifying the remote endpoint so that RvS-R at the remote endpoint does not know when to copy data to or from the memory 148 of the applications 147.

Figure 5:
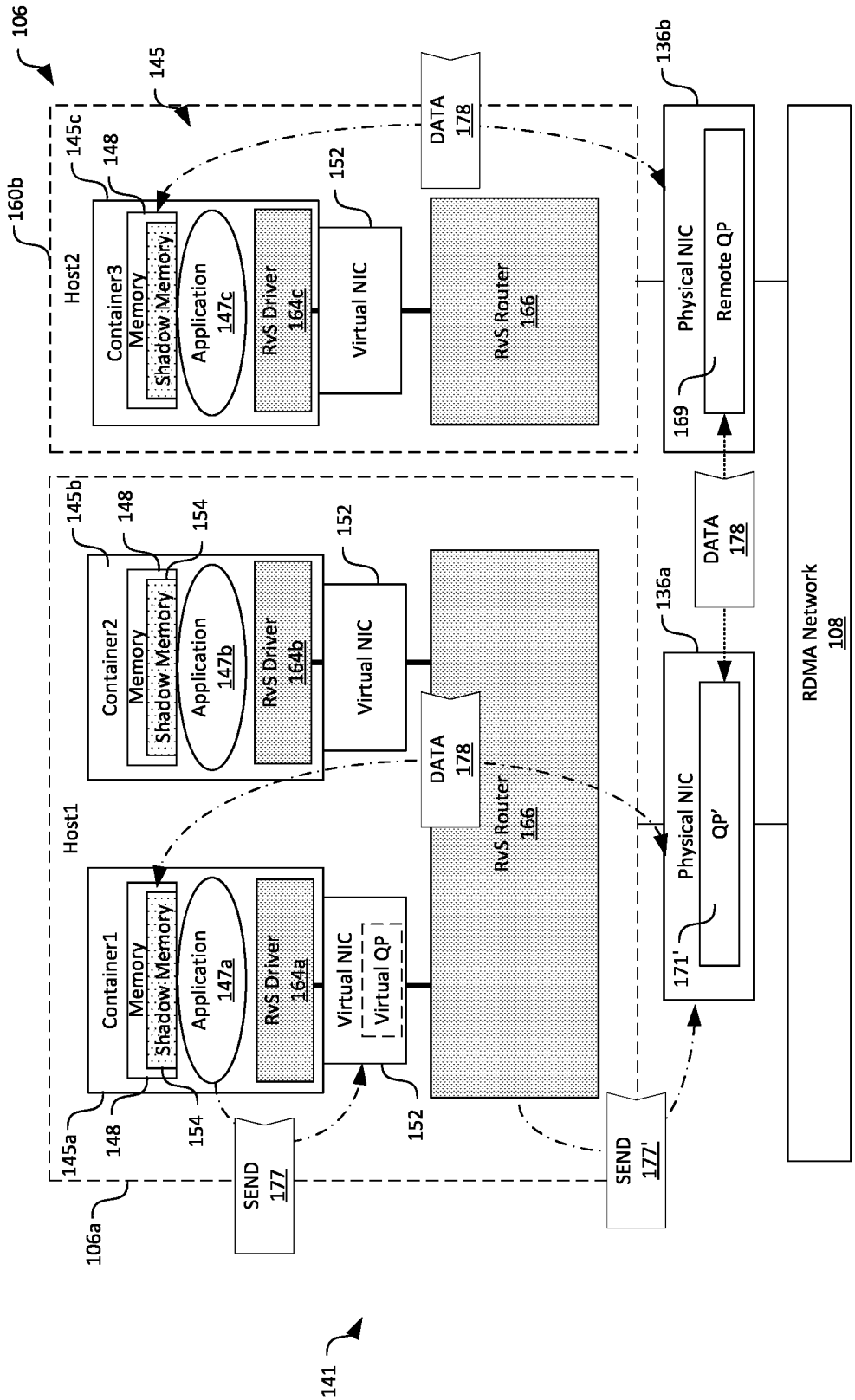
FIG. 5 is a schematic diagram illustrating another software-based RDMA virtualization framework implemented with a zero-copy mechanism in accordance with embodiments of the disclosed technology.

Several embodiments of the disclosed technology can address the foregoing difficulty by implementing a zero-copy mechanism to efficiently support one-side RDMA operations. In particular, as shown in FIG. 5, mem and s-mem can both include virtual memories that are pointed to the same memory block(s) in the physical memory 134. As such, the RvS-R does not need copy any data from mem to s-mem. By eliminating such data copying, performance of the RvS framework 141 can thus be improved. In one implementation, memory allocation and de-allocation functions (e.g., ibv_malloc for memory allocation and ibv_free for memory de-allocation) can be implemented to allow the applications 147 to invoke these functions to delegate memory allocation and de-allocation to the RvS framework 141. In response to the applications 147 invoking the memory allocation function, the RvS-L can directly allocate memory 148 in a shared memory region with RvS-R in the physical memory 134, and thus avoid data copy between mem and s-mem. In another implementation, when an application 147 registers mem with a virtual memory address (VA) as a data buffer for data transfer, the RvS-L releases the memory block in the physical memory 134 behind VA and assigns a shared physical memory block with RvS-R to VA. As such, both mem and s-mem can be pointed to the same memory block in the physical memory 134.

Figure 6:
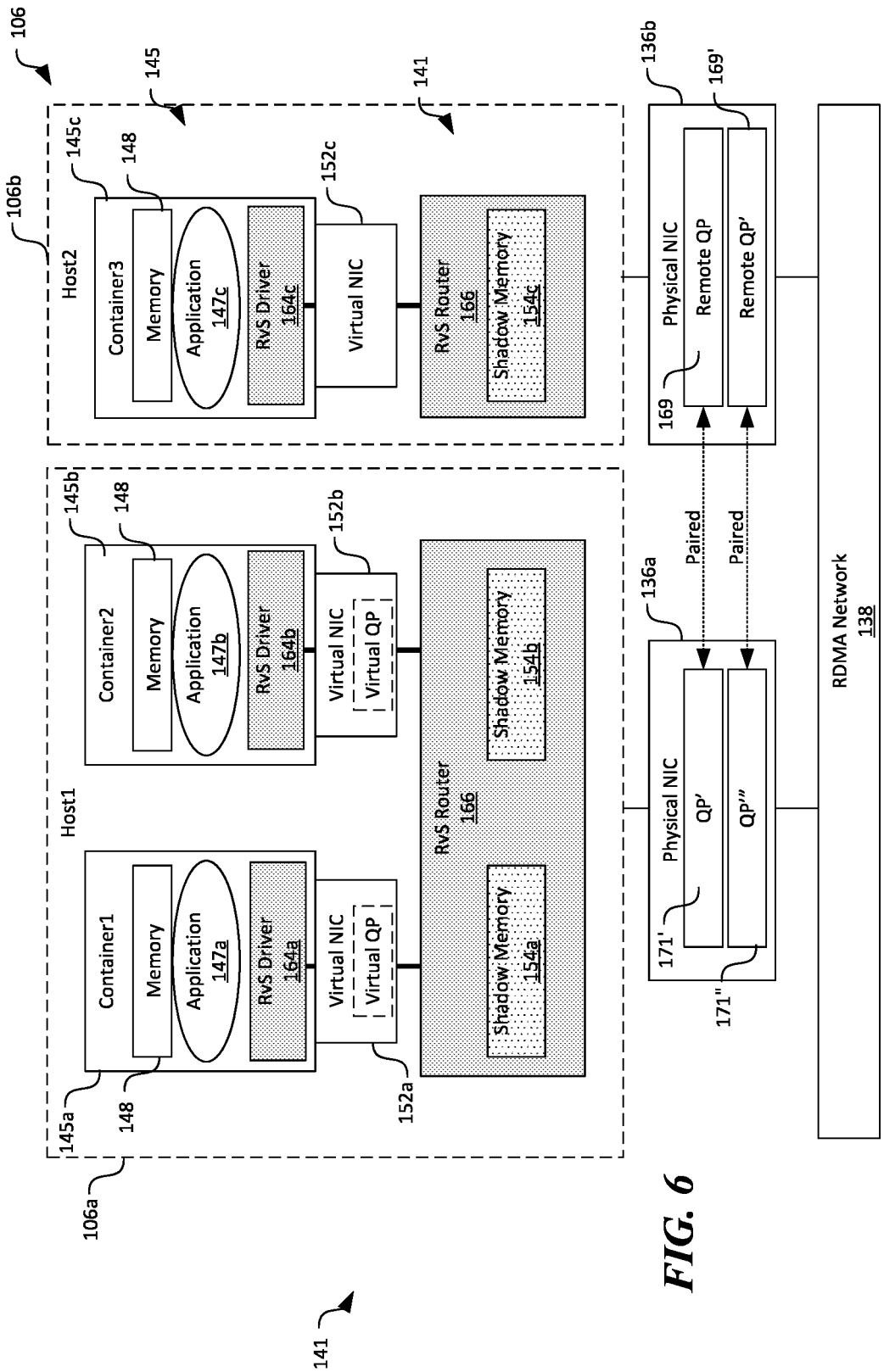
FIG. 6 is a schematic diagram illustrating another software-based RDMA virtualization framework facilitating multiple queue pairs in accordance with embodiments of the disclosed technology.

Even though FIGS. 3A-5 show the RvS framework 141 supporting one set of paired queues, in other embodiments, the RvS framework 141 can also support multiple sets of paired queues. For example, as shown in FIG. 6, the RvS framework 141 can also facilitate communication between the second container 145b and the third container 145c by creating another QP''' 171'' in the first physical NIC 136a. The created QP''' 171'' can be paired with another remote QP'' 169' at the second host 106b. As described above with reference to FIGS. 3A-3E, during connection establishment, the RvS-R can allocate a second shadow memory 154b to the second application 147b. The second shadow memory 154b can be isolated from the first shadow memory 154a such that isolation of the first and second containers 145a and 145b are maintained.

In any of the embodiments described above with reference to FIGS. 3A-6, the RvS framework 141 intercepts every RDMA calls via the RvS-L, translates, and forwards translated calls to the physical NICs 136 via the RvS-R. Several embodiments of the disclosed technology are also directed to establishing an efficient communications channel between the RvS-L and RvS-R to provide high RDMA performance without overtaxing system resources. In the following description, two implementations of such communications channels are presented. Selection of such implementations can be based on application requirements and/or other suitable criteria.

A first implementation of the communications channel is based on forwarding RDMA calls via NIC file descriptor. For example, in one implementation, a NIC file descriptor in the container 145 can be replaced with another file descriptor (e.g., a Unix socket file descriptor) corresponding to the RvS-R. As such, the RvS-R can learn the command sent by the application 145 and any supplied parameters. The RvS-R can map the operations to virtual QP 152 in the container 145 to the same operations to the actual QP' 171' in the physical NIC 136. The RvS-R can then convert any replies from the physical NIC 136 to replies from the virtual NIC 152 for the virtual QP 171, and return the converted reply to the RvS-L via, for example, the Unix socket. A NIC driver communication layer (not shown) in the RvS-L can then process the received reply normally without knowing about the operations behind the Unix socket file descriptor.

In certain implementations, to accelerate communications between the RvS-R and RvS-L, several embodiments of the disclosed technology can include implementing a parallel path with file descriptor channel between the RvS-R and RvS-L. For example, the RvS-L and RvS-R can co-own a dedicated piece of shared memory. With the parallel path, the RvS-R spins on a CPU core of the processor 132 (FIG. 2) and keeps checking whether the shared memory piece contains a new request from the RvS-L. Once a request is detected, the RvS-R can immediately execute the new request while the RvS-L starts to spin on the same or different CPU core to check whether the response is ready. After reading the response, the RvS-L can stop the CPU spinning on its side. Embodiments of the foregoing parallel path can significantly reduce communications latency between the RvS-R and RvS-L.

FIGS. 7A-7D are flowcharts illustrating processes for virtual RDMA switching for containers in accordance with embodiments of the disclosed technology. Several embodiments of the processes can enable RDMA communications for containers while maintaining isolation, portability, and controllability of communication parameters. Even though the processes are described below in the context of the distributed computing system 100 of FIGS. 1-6, in other embodiments, the processes may be implemented in computing system with additional or different components.

Figure 7A:
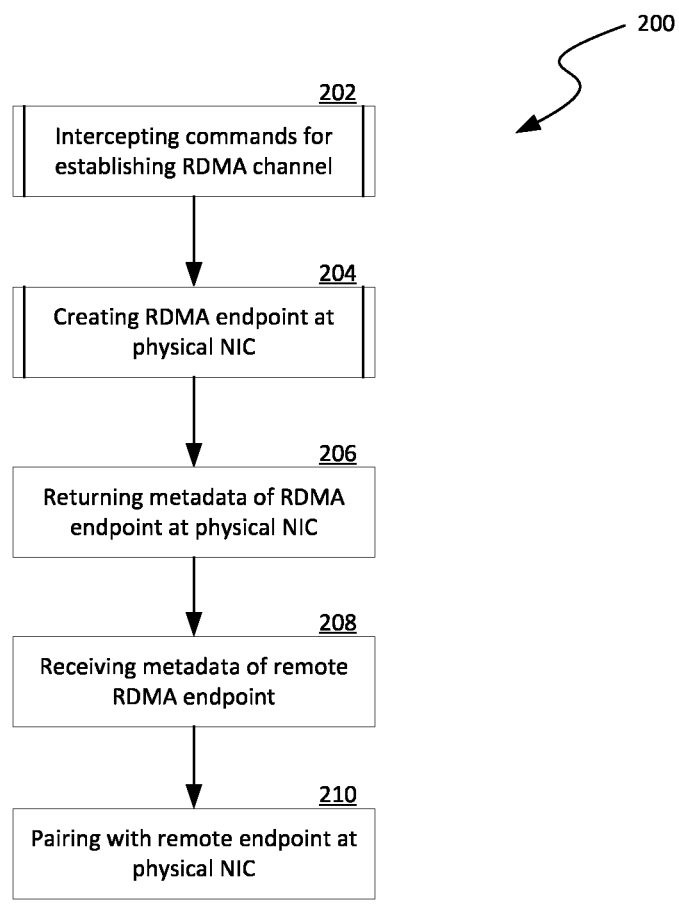
FIGS. 7A-7D are flowcharts illustrating processes for virtual RDMA switching for containers in accordance with embodiments of the disclosed technology.

As shown in FIG. 7A, a process 200 of virtual RDMA switching can include intercepting one or more commands from an application executing in a container to a virtual NIC for establishing an RDMA channel with a remote application executing in a remote container at stage 202. Both applications and containers can be identified by a corresponding virtual network address in a virtual network interconnecting the containers. The intercepted commands can include API calls such as for creating QPs and CQs, registering an application memory, and querying for available NICs.

The process 200 can then include creating an RDMA endpoint at a physical NIC corresponding to the virtual NIC at stage 204. In certain embodiments, creating the RDMA endpoint can include creating another QP' and CQ' at the physical NIC. Creating the RDMA endpoint can also include allocating a shadow memory of the same size as the application memory and registering the shadow memory to the physical NIC. In other embodiments, creating the RDMA endpoint can also include other suitable operations. In one implementation, the shadow memory can include a virtual memory space that points to the same memory location in a physical memory as the application memory. In other implementations, the shadow memory can include a virtual memory space that points to a different memory location as the application memory. Example operations for intercepting commands and creating the RDMA endpoint at the physical NIC are described in more detail below with reference to FIG. 7B.

As shown in FIG. 7A, the process 200 can then include returning metadata of the created RDMA endpoint at the physical NIC to the application at stage 206. The returned metadata can include a routable address (GID) of the created QP', an identification of the created QP (QP-ID), memory keys, or other suitable information. The process 200 can then include receiving additional metadata of a remote RDMA endpoint from the application at stage 208. The additional metadata can include similar or different information than that returned to the application in stage 206. The process 200 can then include pairing the created RDMA endpoint at the physical NIC with the remote RDMA endpoint using the received additional metadata from the application at stage 210. As such, even though to the application, an RDMA channel is established with the remote application using the virtual network address, the established RDMA channel is actually between the physical NICs at respective hosts that support the containers. As such, virtual networking for the containers can be maintained while RDMA networking is enabled.

Figure 7B:
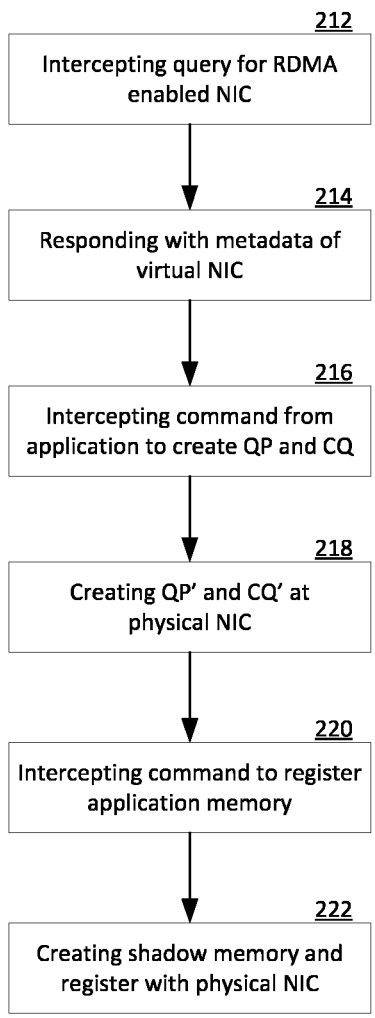

FIG. 7B illustrates example operations for intercepting commands and creating the RDMA endpoint at the physical NIC. As shown in FIG. 7B, the operations can include intercepting a query from the application for available RDMA enabled NICs at stage 212. The operations can then include responding to the received query with metadata of a virtual NIC supported by a physical NIC that is RDMA enabled at the host at stage 214. The metadata can include data representing a behavioral description of the virtual NIC including, for instance, semantics of virtual NIC services and a list of operations (sometimes referred to as "Verbs") the virtual NIC can perform.

The operations can then include intercepting a command from the application to create a QP and CQ at the virtual NIC at stage 216. Upon intercepting the command to create the QP and CQ, the operations can include creating corresponding QP' and CQ' at the physical NIC at stage 218. The operation can then include intercepting another command to register an application memory to the created QP at stage 220. The application memory can contain data to be transmitted via the established RDMA connection. In response to intercepting the another command to register the application memory, the operations can include creating a shadow memory corresponding to the application memory and register the shadow memory to the created QP' and CQ' at the physical NIC at stage 222. In certain embodiments, the shadow memory can include a virtual memory block of the same size as the application memory and pointing to the same memory block in a corresponding physical memory on the host. In other embodiments, the shadow memory can include a virtual memory block of a different size (e.g., larger) than that of the application memory. The virtual memory block of the shadow memory may point to different memory blocks as those of the application memory in the physical memory.

Figure 7C:
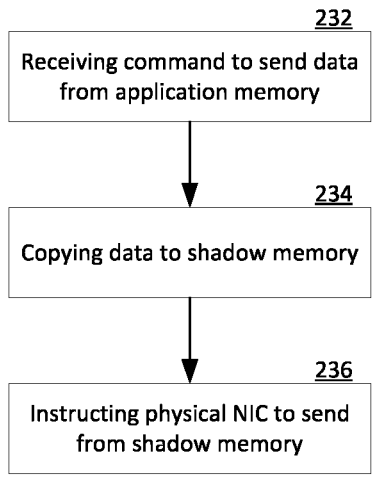

FIG. 7C illustrates example operations of transmitting data using an RDMA connection established according to embodiments of the process 200 in FIG. 7A. As shown in FIG. 7C, the operations can include receiving a command from the application to send data from the application memory at stage 232. The command can also include a memory pointer to the application memory at which the data to be sent begins. The operations can then include copying the data from the application memory to the shadow memory according to the memory pointer at stage 234. The operations can then include instructing the physical NIC to send the copied data from the shadow memory at stage 236.

Figure 7D:
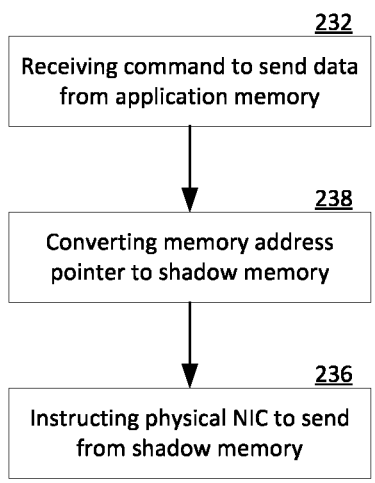

FIG. 7D illustrates additional example operations of transmitting data using an RDMA connection established according to embodiments of the process 200 in FIG. 7A. The operations in FIG. 7D differ those in FIG. 7C in that the shadow memory and the application memory can both include a corresponding virtual memory block that points to the same memory block in the corresponding physical memory. As such, instead of copying the data from the application memory to the shadow memory at stage 234 in FIG. 7C, the operations in FIG. 7D includes converting the memory address pointer of the application memory to one of the shadow memory at stage 238. The operations can then include instructing the physical NIC to send the copied data from the shadow memory at stage 236.

Figure 8:
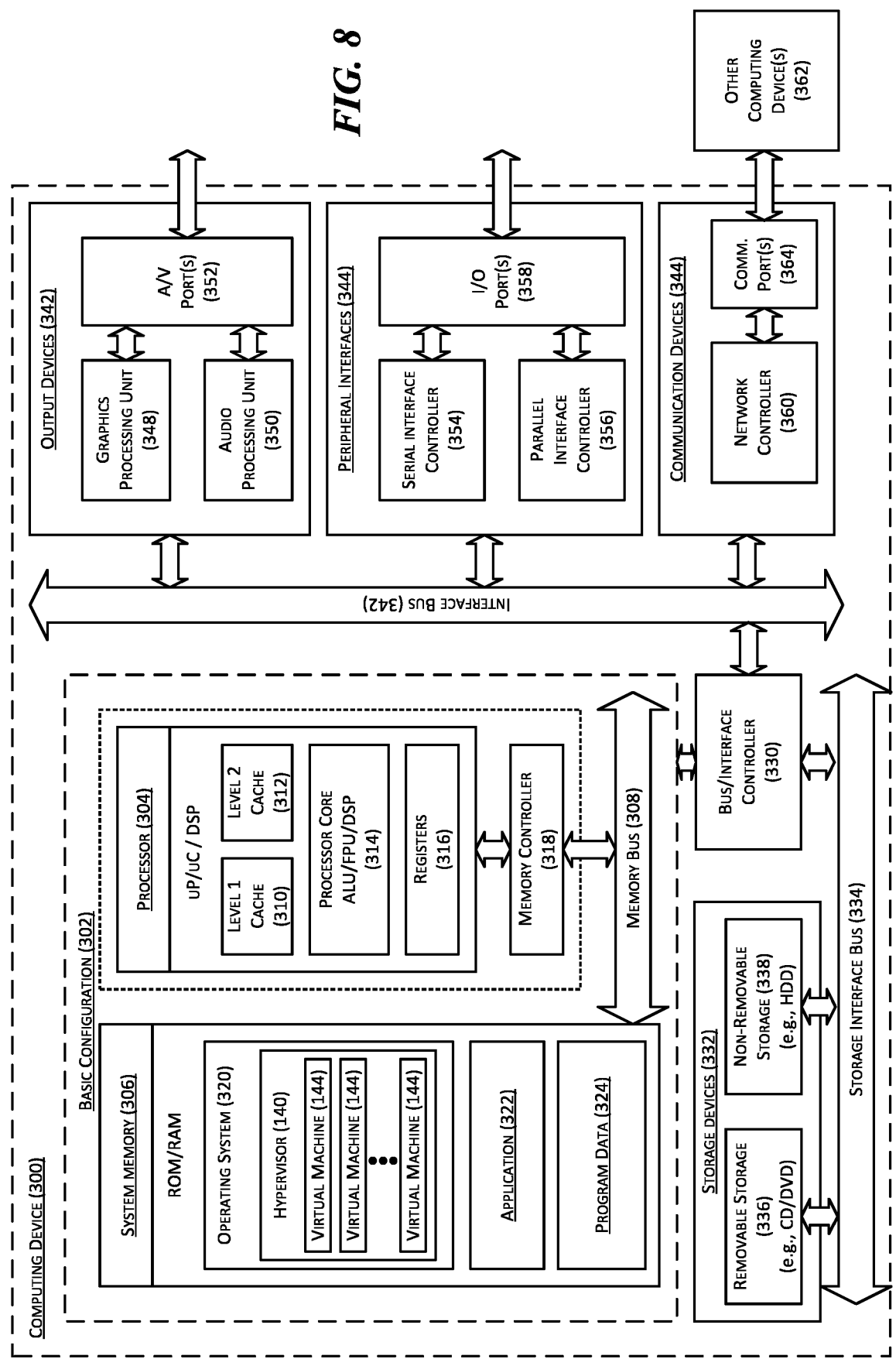
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for implementing virtual remote direct memory access (RDMA) in a distributed computing system having a plurality of servers interconnected by an RDMA network, the method comprising:
   intercepting, from a container or virtual machine on a first server of the plurality of servers, a command to send data from a memory of the container or virtual machine to a remote container or virtual machine on a remote server via a first RDMA connection, the container or virtual machine on the first server and the remote container or virtual machine on the remote server identified by a corresponding virtual network address in a virtual network; and
   in response to the intercepted command:
   transferring the data to a shadow memory allocated to correspond to the memory of the container or virtual machine on the first server and having the same size as the memory of the container or virtual machine on the first server; and
   transmitting the transferred data from the shadow memory to the remote container or virtual machine on the remote server via a second RDMA connection in the RDMA network between the first server and the remote server, the second RDMA connection corresponding to the first RDMA connection.

2. The method of claim 1 wherein:
   the memory of the container or virtual machine of the first server and the shadow memory point to different memory locations in physical memory of the first server; and
   transferring the data comprises copying the data from the memory of the container or virtual machine of the first server to the shadow memory.

3. The method of claim 1 wherein:
   the memory of the container or virtual machine of the first server and the shadow memory point to a same memory location in physical memory of the first server; and
   transferring the data comprises translating a virtual memory address of the memory of the container or virtual machine of the first server to another virtual memory address of the shadow memory.

4. The method of claim 1, wherein the command is a first command, further comprising:
   intercepting a second command for a completion status of an operation corresponding to the first command to send data from the memory of the container or virtual machine of the first server; and
   in response to the intercepted second command,
   querying for a completion status; and
   returning data representing the queried completion status to the container or virtual machine of the first server.

5. The method of claim 1 wherein:
   the command is a first command;
   the memory of the container or virtual machine of the first server and the shadow memory point to different memory locations in physical memory of the first server;
   the data to be sent has a memory pointer in the memory of the container or virtual machine of the first server; and
   transferring the data comprises copying the data from the memory of the container or virtual machine of the first server to the shadow memory according to the memory pointer and subsequently, invoking another command to send the copied data in the shadow memory from a physical NIC at the first server to another physical NIC at the remote server.

6. The method of claim 1 wherein:
   the command is a first command;
   the memory of the container or virtual machine of the first server and the shadow memory point to a same memory location in physical memory of the first server;
   the data to be sent has an application memory pointer and a shadow memory pointer different from the application memory pointer; and
   transferring the data comprises translating the application memory pointer to the shadow memory pointer and subsequently, invoking a second command to send the data in the shadow memory according to the translated shadow memory pointer from a physical NIC at the first server to another physical NIC at the remote server.

7. The method of claim 1 wherein:
   the command is a first command; and
   intercepting the first command comprises:
   intercepting the first command from the container or virtual machine of the first server to a virtual NIC corresponding to the container or virtual machine of the first server;
   translating the intercepted command to a second command for an RDMA enabled physical network interface card (NIC); and forwarding the translated second command to the RDMA enabled physical NIC for execution, the RDMA enabled physical NIC corresponding to the virtual NIC corresponding to the container or virtual machine of the first server.

8. A method for implementing virtual remote direct memory access (RDMA) in a distributed computing system having a plurality of servers interconnected by an RDMA network, the method comprising:
intercepting, from an application executing in a container or virtual machine on a server, a first command to establish an RDMA connection with a remote container identified by a virtual network address of a virtual network;
in response to the intercepted first command, creating an RDMA endpoint associated with the server;
intercepting, from the application executing in the container or virtual machine on the server, a second command to pair with a remote RDMA endpoint associated with a remote container or virtual machine, the intercepted second command containing data representing a routable network address of the remote RDMA endpoint in the RDMA network; and
in response to the intercepted second command, pairing the RDMA endpoint created at the server with the remote RDMA endpoint at the remote container or virtual machine using the routable network address of the remote RDMA endpoint, thereby establishing an RDMA connection between the RDMA endpoint at the server and the remote RDMA endpoint at the remote container or virtual machine as corresponding to the RDMA connection between the container or virtual machine and the remote container or virtual machine.

9. The method of claim 8 wherein:
intercepting the first command to establish the RDMA connection comprises intercepting a command to create an RDMA endpoint in a virtual network interface card (NIC) supported by a physical NIC of the server; and
in response to intercepting the first command:
creating the RDMA endpoint at the physical NIC of the server; and
returning, to the application, data representing an identification of a write queue, read queue, and completion queue of the RDMA endpoint.

10. The method of claim 8, wherein:
intercepting the first command to establish the RDMA connection comprises intercepting a command to register an application memory to the created RDMA endpoint; and
in response to intercepting the first command:
allocating a shadow memory corresponding to the application memory; and
registering the allocated shadow memory to the created RDMA endpoint at a physical NIC.

11. The method of claim 8, wherein:
intercepting the command to establish the RDMA connection comprises intercepting a command to register an application memory to the created RDMA endpoint; and
in response to intercepting the first command:
allocating a shadow memory corresponding to the application memory, wherein the allocated shadow memory and the application memory are of a single size; and
registering the allocated shadow memory to the created RDMA endpoint at a physical NIC.

12. The method of claim 8, wherein:
intercepting the command to establish the RDMA connection includes intercepting a command to register an application memory to the created RDMA endpoint; and
in response to intercepting the command:
allocating a shadow memory corresponding to the application memory, wherein the shadow memory and the application memory are virtual memories both pointing to a same memory location in a physical memory of the server; and
registering the allocated shadow memory to the created RDMA endpoint at a physical NIC.

13. The method of claim 12, further comprising:
intercepting a second command from the application to send data from the application memory to the remote container or virtual machine; and
in response to intercepting the second command,
copying the data from the application memory to the shadow memory; and
instructing a physical NIC to send the copied data from the shadow memory to the paired remote RDMA endpoint.

14. The method of claim 12, further comprising:
intercepting a second command from the application to send data from the application memory to the remote container or virtual machine; and
in response to intercepting the second command:
translating a virtual memory address of the application memory to another virtual memory address of the shadow memory without copying the data from the application memory to the shadow memory; and
instructing a physical NIC to send the copied data from the shadow memory to the paired remote RDMA endpoint based on the translated another virtual memory address.

15. The method of claim 8, wherein:
the routable network address is a first routable network address; and
the created RDMA endpoint at a physical NIC of the server has a second routable network address of the created RDMA endpoint in the RDMA network;
the method further comprising:
returning data representing the second routable network address of the created RDMA endpoint to the application executing in the container or virtual machine of the server, the returned data usable by the application to pair with the remote container or virtual machine by exchanging the data using the virtual network address of the remote container or virtual machine.

16. The method of claim 8, wherein:
intercepting the command to establish the RDMA connection includes intercepting a command to register an application memory to the created RDMA endpoint, the application memory being a first virtual memory; and
in response to intercepting the command:
allocating a memory block of physical memory to the application memory; and
allocating a shadow memory corresponding to the application memory, the shadow memory being a second virtual memory pointing to a same memory block in the physical memory of the server as the first virtual memory.

17. The method of claim 8, wherein:
intercepting the command to establish the RDMA connection includes intercepting a command to register an application memory to the created RDMA endpoint, the application memory being a first virtual memory corresponding to a first memory block in physical memory of the server; and in response to intercepting the command, allocating a shadow memory corresponding to the application memory, the shadow memory being a second virtual memory pointing to a second memory block in the physical memory of the server;

releasing the first virtual memory from the first memory block in the physical memory; and assigning the second memory block in the physical memory to the first virtual memory.

18. A computing device in a distributed computing system having a plurality of servers interconnected by an RDMA network, the computing device and the servers individually having a processor and a physical memory operatively coupled to one another, the physical memory of the computing device comprising instructions executable by the processor to cause the computing device to perform operations comprising:

intercepting, from a container or virtual machine on a first server of the plurality of servers, a command to send data from a memory of the container or virtual machine to a remote container or virtual machine on a remote server via a first RDMA connection, the container or virtual machine on the first server and the remote container or virtual machine on the remote server identified by a corresponding virtual network address in a virtual network; and in response to the intercepted command:

transferring the data to a shadow memory allocated to correspond to the memory of the container or virtual machine on the first server and having the same size as the memory of the container or virtual machine on the first server; and transmitting the transferred data from the shadow memory to the remote container or virtual machine on the remote server via a second RDMA connection in the RDMA network between the first server and the remote server, the second RDMA connection corresponding to the first RDMA connection.

19. The computing device of claim 18, wherein:

the memory of the container or virtual machine on the first server and the shadow memory point to different memory locations in physical memory of the first server; and transferring the data comprises copying the data from the memory of the container or virtual machine on the first server to the shadow memory.

20. The computing device of claim 18 wherein:

the memory of the container or virtual machine on the first server and the shadow memory point to a same memory location in physical memory of the first server; and transferring the data comprises translating a virtual memory address of the memory of the container or virtual machine on the first server to another virtual memory address of the shadow memory.

* * * * *